Feb. 10, 1953     G. D. WANNER     2,627,693
FISHING FLOAT
Filed Sept. 18, 1950
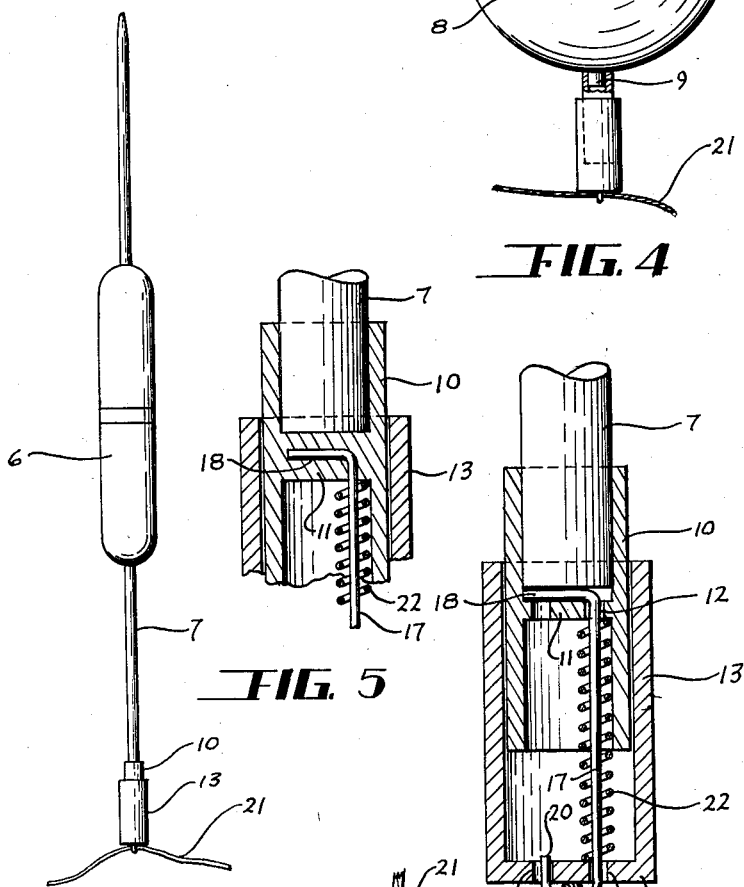
INVENTOR.
GEORGE D WANNER
BY
*Emmare Reed*
HIS ATTORNEY Patented Feb. 10, 1953

2,627,693

UNITED STATES PATENT OFFICE 2,627,693

FISHING FLOAT

George D. Wanner, Dayton, Ohio

Application September 18, 1950, Serial No. 185,426

3 Claims. (Cl. 43—44.95)

This invention relates to a float for a fishing line and more particularly to a float including a device for attaching the fishing line thereto.

Floats having line attaching devices have been produced heretofore but some were of an expensive construction and others were unsatisfactory in operation.

One object of the present invention is to provide such a float which can be produced at a very low cost and which is entirely satisfactory in use.

A further object of the invention is to provide a float with an attaching device comprising a small number of parts which are of such a character that they can be quickly and easily assembled.

A further object of the invention is to provide such a line attaching device which is easily operated to attach and detach the line and which firmly grips the line.

A further object of the invention is to provide such a line attaching device which can be assembled as a unit independently of the float and thereafter attached to the float.

Other objects of the invention may appear as the device is described in detail.

In the accompanying drawings Fig. 1 is a side elevation of a float having an attaching device secured thereto; Fig. 2 is an elongate sectional view taken through the attaching device; Fig. 3 is an outer end elevation of the device with the line attached thereto; Fig. 4 is a side elevation, partly in section, of a different type of float equipped with the attaching device; and Fig. 5 is a longitudinal sectional view of a part of the attaching device showing a slightly modified form thereof.

In these drawings I have illustrated an embodiment of the invention, together with minor modifications thereof, but it is to be understood that the device as a whole, as well as the several parts thereof, may take various forms and may be attached to floats of various kinds without departing from the spirit of the invention.

The line attaching device comprises two elongate members one of which is adapted to be secured to the float and the other of which is slidably supported on the first mentioned member and is biased outwardly, its outward movement being limited by a connecting member attached to the first mentioned member, the connecting member and the slidable member having cooperating parts to receive a fishing line between them and to grip the same. The line attaching device may be used with a float of any suitable character and may be connected therewith in any suitable manner. In Fig. 1 the float is shown at 6 as of an elongate construction and having rigid therewith and projecting from one end thereof a relatively long stud 7 to which the device may be attached. In Fig. 4 the float is shown at 8 as spherical in form, and having rigid therewith a relatively short stud 9.

In the particular form here illustrated in Figs. 1, 2 and 3 the attaching device comprises two telescoping tubular members connected one with the other for relative longitudinal movement. The small diameter or inner and main body member 10 has at its inner end an internal diameter corresponding substantially to the diameter of the stud 7, or 8, to which it may be rigidly secured in any suitable manner, as by cementing the same thereto, and is stationary with relation to the float. Members 7 and 10 are telescopically mounted. When so secured the member 10 extends outwardly in line with the stud. This member is provided with an internal part, such as a partition 11, having therein an opening 12. The larger diameter or outer member 13 is telescopically and slidably supported on the inner member 10. The outer substantially cup-shaped member 13 extends outwardly beyond member 10 and its outward movement with relation to the stationary inner member is limited by a rod 17. The rod 17 may be connected with the stationary member in any suitable manner which will prevent the outward movement thereof and which will, preferably, prevent the rotation thereof about its longitudinal axis. As shown in Fig. 2, the rod extends through the opening 12 in the partition 11 and has a transverse end portion on the inner side of the partition to prevent the outward movement thereof. The transverse portion is of such length that it will engage the inner cylindrical surface of the stationary member and prevent the rotation of the rod, the opening 12 being off center. If desired the transverse portion of the rod may be imbedded in the partition 11 by casting the same therein, as shown in Fig. 5, or the rod may be otherwise connected with the inner member.

The slidable outer member has adjacent its outer end a transverse portion, such as an end wall 14, which is provided with spaced opening 15 and 16. The outer end of the rod 17 extends through the opening 15 in the end wall of the slidable member 13, and the outer end portion 19 thereof is bent laterally to a position transverse to the length of the rod and this transverse portion is provided with an inturned end portion 20 adapted to enter the second opening, 16, in the end wall 14. Spring means are interposed between the end wall 14 and the partition 11 to move the member 13 outwardly with relation to the member 10 and thus move the end wall 14 toward the transverse portion 19 of the rod so as to clamp a line 21 between this transverse portion and the end wall. Preferably the spring means is in the nature of a compression spring 22 coiled about the longitudinal portion of the rod 17 and having its ends in engagement respectively with the partition 11 and the end wall 14.

When the line is to be attached to the float the slidable outer member 13 is pressed inwardly toward the float, against the action of the spring 22, a distance greater than the length of the inturned end 20 of the rod, thus disengaging the end wall from the rod and providing a space between the end wall and the inturned end 20 of the rod which will permit the line to be moved laterally between the same to a position between the lateral portion 19 of the rod and the end wall 14. When the line has been inserted between the transverse portion of the rod and the end wall of the slidable member the latter is released and is moved outwardly by the spring, with relation to the rod to cause the inturned end portion of the rod to again enter the opening 16 and the transverse portion 19 thereof to engage the line, thus clamping the line against the end wall and holding the parts against relative rotation.

The transverse portion 19 of the rod 17 will ordinarily grip the line with sufficient force to prevent the movement thereof with relation to the end wall 14 without the use of the inturned end 20, but the inturned end is desirable to provide a positive connection and prevent the release of the line by a strong pull on the line. Further it will be noted that the pull of the line is exerted on the transverse part 19 of the rod 17, which is positively held against movement with relation to the float. Consequently there is no possibility of a strong pull on the line moving the rod against the action of the spring and thus releasing the line.

It is sometimes desired to so connect the line with the float that it may have longitudinal movement with relation to the float and this can be accomplished by rotating the outer slidable member, after the line has been inserted, to move the opening 16 out of line with the inturned end of the rod 20, as shown in broken lines in Fig. 3, thus when released the end wall of the slidable member will engage the inturned end of the rod and the transverse portion 19 of the rod will be held out of gripping relation with the line but the line will be prevented from escaping from between the rod and the end wall.

Preferably the relatively movable members 10 and 13 are formed by molding the same from suitable plastic material, and the attaching device is assembled prior to attaching the same to the stud on the float. The preferred method of assembly is to provide a straight rod 17 with the laterally extending portion 18 only, to then insert the straight portion of the rod through the opening 12 in the partition 11, place the spring 17 about the rod, insert the stationary inner member 10 in the outer slidable member 13 and insert the outer end portion of the rod through the opening 15 of the slidable member. The slidable member is then moved inwardly against the action of the spring to enable the projecting end of the rod to be bent to substantially U-form with its short leg 20 spaced from its longer leg a distance approximating the distance between the openings 15 and 16, which can be quickly accomplished by a suitable implement. When this has been accomplished, the assembly of the attaching device per se is completed, and the parts are retained in their assembled relation. The assembled device may then be connected with a float as by inserting a stud on the float in the inner end of the stationary member and securing the same thereto. Obviously all of the operations of this assembly can be quickly performed at a low cost and as a result the float with the attaching device thereon can be produced and sold at a correspondingly low cost.

Having now fully shown and described my invention, what I claim as new and desire to secure by Letters Patent, is:

1. A line attaching device including a main body member, a float having an extension received in and fixedly secured to one end of the main body member, said main body member having a partition extending across the center thereof midwise between its ends, a cup-shaped member having an apertured end wall, said cup-shaped member being telescopically arranged with the main body member, said cup-shaped member extending outwarly from the one end of the main body member opposite the end of the main body member having the float attached thereto, a rod secured to the partition of the main body member, said rod having a laterally extending outer portion to grip a fishing line between the same and the end wall of the cup-shaped member, and a compression spring confined between the partition and the end wall of the cup-shaped member so as to clamp the line between the laterally extending part of said rod and the end wall of the cup-shaped member.

2. A line attaching device according to claim 1, wherein both ends of the main body member are tubular and wherein the extension of the float is fixedly projected into one tubular end and cemented thereto.

3. A line attaching device according to claim 1, wherein the main body member has an outer surface that is substantially cylindrical and wherein the cup-shaped member has an internal diameter slightly greater than the external diameter of the main body member so that the end of the main body member projects into the cup-shaped member.

GEORGE D. WANNER.

REFERENCES CITED

The following references are of record in the file of this patent:

UNITED STATES PATENTS

| Number | Name | Date |
|---|---|---|
| 514,034 | Redfield | Feb. 6, 1894 |
| 575,674 | Woodward | Jan. 19, 1897 |
| 2,501,471 | Larson | Mar. 21, 1950 |